(12) United States Patent
Pomerantz

(10) Patent No.: US 8,205,121 B2
(45) Date of Patent: Jun. 19, 2012

(54) REDUCING OVERPOLLING OF DATA IN A DATA PROCESSING SYSTEM

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1474 days.

(21) Appl. No.: 11/689,234

(22) Filed: Mar. 21, 2007

(65) Prior Publication Data

US 2008/0235532 A1 Sep. 25, 2008

(51) Int. Cl.
*G06F 11/30* (2006.01)
(52) U.S. Cl. ........ 714/47.1; 709/232; 709/235; 718/105
(58) Field of Classification Search .................. 714/47.1; 709/232, 235; 718/105
See application file for complete search history.

(56) References Cited

U.S. PATENT DOCUMENTS

| 6,449,663 | B1 | 9/2002 | Carney et al. | |
|---|---|---|---|---|
| 2002/0112053 | A1* | 8/2002 | Christensen et al. | 709/224 |
| 2003/0212784 | A1 | 11/2003 | Nguyen | |
| 2006/0195615 | A1* | 8/2006 | Gollapudi et al. | 709/247 |
| 2006/0271661 | A1* | 11/2006 | Qi et al. | 709/223 |
| 2007/0242688 | A1* | 10/2007 | McFarland | 370/445 |
| 2007/0282621 | A1* | 12/2007 | Altman et al. | 705/1 |
| 2008/0068131 | A1* | 3/2008 | Cargonja et al. | 340/10.1 |
| 2008/0168093 | A1* | 7/2008 | De Marcken | 707/104.1 |
| 2008/0301278 | A1* | 12/2008 | Jones et al. | 709/223 |

FOREIGN PATENT DOCUMENTS

JP 06075887 3/1994

OTHER PUBLICATIONS

Inomata et al., "Statistical Polling Method", IBM Technical Disclosure, www.ip.com, IPCOM000061036D, Jun. 1, 1986, pp. 293-295.
Illner, "Smart Poll Algorithm", Motorola Technical Disclosure, www.ip.com, IPCOM000008003D, Mar. 1, 1997, pp. 58-60.

* cited by examiner

*Primary Examiner* — Scott Baderman
*Assistant Examiner* — Chae Ko
(74) *Attorney, Agent, or Firm* — Yee & Associates, P.C.; Jeffrey S. LaBaw

(57) ABSTRACT

A computer implemented method, apparatus, and computer usable program code for reducing overpolled data in a data processing system is provided. A controller identifies a set of redundant measurements in a cycle. The controller then identifies a number of measurements repeated in the set of redundant measurements. The controller the computes a percentage of redundant polls based on the number of measurements repeated in the set of redundant measurements. The controller then computes a new polling period by reducing an original polling period by the percentage of redundant polls.

9 Claims, 2 Drawing Sheets

REDUCING OVERPOLLING OF DATA IN A DATA PROCESSING SYSTEM

BACKGROUND OF THE INVENTION

1. Field of the Invention

The present invention relates generally to an improved data processing system. More specifically, the present invention relates to an improved system of monitoring operating parameters. Still more specifically, the present invention is a computer implemented method and apparatus for reducing overpolling of data in a data processing system.

2. Description of the Related Art

Computers periodically request and present information to a user regarding the performance of the particular computer. The performance information can be any operating parameter that affects the overall operation of the computer, such as an operating temperature, amount of Central Processing Unit (CPU) usage, or amount of available memory. Each request for information is typically referred to as a poll, and the frequency with which information is polled is referred to as a polling period.

In certain circumstance, a computer will poll information at a frequency greater than the frequency in which the information changes. As a result, the polled information is sometimes redundant. Consequently, the gathering of redundant information unnecessarily utilizes resources that can be allocated to other activities within the computer.

SUMMARY OF THE INVENTION

A computer implemented method, apparatus, and computer usable program code for reducing overpolled data in a data processing system is provided. A controller identifies a set of redundant measurements in a cycle. The controller then identifies a number of measurements repeated in the set of redundant measurements. The controller then computes a percentage of redundant polls based on the number of measurements repeated in the set of redundant measurements. The controller then computes a new polling period by reducing an original polling period by the percentage of redundant polls.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
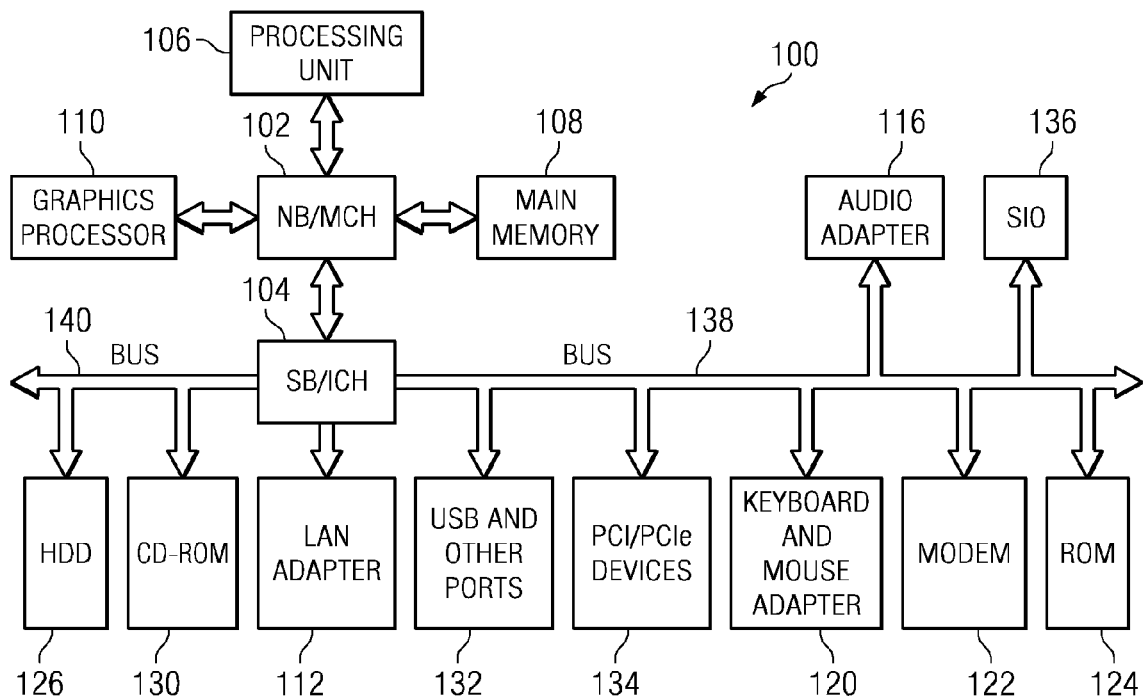
FIG. 1 depicts a block diagram of a data processing system in which illustrative embodiments may be implemented.

FIG. 1 depicts a block diagram of a data processing system in which illustrative embodiments may be implemented. Data processing system 100 is an example of a computer in which code or instructions implementing the processes of the illustrative embodiments may be located. In alternative embodiments, data processing system 100 can also be a server, a personal digital assistant (PDA), a wireless mobile device, or any other similar type of data processing system.

In the depicted example, data processing system 100 employs a hub architecture including a north bridge and memory controller hub (NB/MCH) 102 and a south bridge and input/output (I/O) controller hub (SB/ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the NB/MCH through an accelerated graphics port (AGP), for example.

In the depicted example, local area network (LAN) adapter 112 is coupled to south bridge and I/O controller hub 104, audio adapter 116, keyboard and mouse adapter 120, modem 122, read only memory (ROM) 124, universal serial bus (USB) and other ports 132 via bus 138. PCI/PCIe devices 134 are also coupled to south bridge and I/O controller hub 104 through bus 138. Hard disk drive (HDD) 126 and CD-ROM 130 are coupled to south bridge and I/O controller hub 104 through bus 140 via bus 138.

PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106. This operating system coordinates and controls various components within data processing system 100 in FIG. 1. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 100. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 126. These instructions and may be loaded into main memory 108 for execution by processing unit 106. The processes of the illustrative embodiments may be performed by processing unit 106 using computer implemented instructions, which may be located in a memory. An example of a memory is main memory 108, read only memory 124, or in one or more peripheral devices.

The hardware shown in FIG. 1 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1. Additionally, the processes of the illustrative embodiments may be applied to a multiprocessor data processing system.

The systems and components shown in FIG. 1 can be varied from the illustrative examples shown. In some illustrative examples, data processing system 100 may be a personal digital assistant (PDA). A personal digital assistant generally is configured with flash memory to provide a non-volatile memory for storing operating system files and/or user-generated data. Additionally, data processing system 100 can be a tablet computer, laptop computer, or telephone device.

Other components shown in FIG. 1 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 108 or a cache such as found in north bridge and memory controller hub 102. Also, a processing unit may include one or more processors or CPUs.

The depicted example in FIG. 1 is not meant to imply architectural limitations. In addition, the illustrative embodiments provide for a computer implemented method, apparatus, and computer usable program code for compiling source code and for executing code. The methods described with respect to the depicted embodiments may be performed in a data processing system.

The illustrative embodiments provide a computer implemented method, an apparatus, and computer usable program code for reducing overpolled data in a data processing system. A controller identifies a set of redundant measurements in a cycle. The controller then identifies a number of measurements repeated in the set of redundant measurements. The controller then computes a percentage of redundant polls based on the number of measurements repeated in the set of redundant measurements. The percentage of redundant polls is calculated by dividing the cycle by the difference in the cycle and the number of measurements repeated. The controller then computes a new polling period by increasing an original polling period by the percentage of redundant polls.

Figure 2:
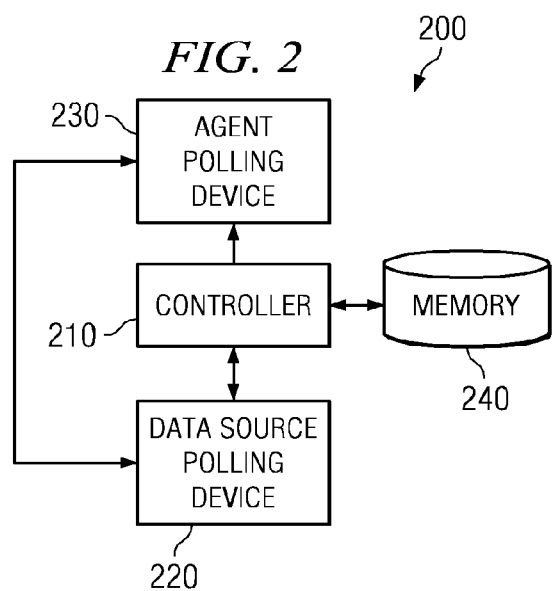
FIG. 2 is a polling frequency system, in accordance with an illustrative embodiment.

FIG. 2 is a polling frequency system, in accordance with an illustrative embodiment. Polling frequency system 200 is a system for reducing overpolled data in a data processing system. Polling frequency system 200 can be implemented in a data processing system, similar data processing system 100 of FIG. 1. Polling frequency system 200 includes controller 210, data source polling device 220, agent polling device 230, and memory 240. All components in polling frequency system 200 are a combination software-embodiment and hardware-embodiment. However, in alternative embodiments, the components in polling frequency system 200 can be an entirely software embodiment or an entirely hardware embodiment.

Polling frequency system 200 is a system for reducing overpolled data. Overpolled data is data that is redundant or has not changed between polling periods. A polling period is a period of time or the frequency in which polling frequency system 200 requests updated information regarding the performance of a data processing system. The requested performance information can be any operating parameter that affects the overall operation of the data processing system.

Controller 210 connects to data source polling device 220, agent polling device 230, and memory 240. Controller 210 can be implemented in the processing unit for polling frequency system 200, similar to processing unit 106 of FIG. 1. Controller 210 manages the time when information is requested from the data processing system. Controller 210 is also responsible for calculating the most efficient polling period. In other words, controller 210 determines when performance information should be requested so that the information is not redundant and yet the most current information.

Data source polling device 220 is a controller or engine that manages requests for updated information from a particular data source. The data source is any memory element that stores operating parameters for a data processing system. An operating parameter is an operating condition of a data processing system, such as fan speed, an operating temperature, amount of Central Processing Unit (CPU) usage, amount of available memory, number of connections to a data processing system, or number of currently running processes.

Operating parameters change based on the number of applications, instructions, or operations being executed in a single period. Each operating parameter changes at a different rate. For example, the operating temperature of a data processing system may not change at the same rate and time as the amount of CPU usage. Similarly, a change in the amount of available memory may not correspond to a change in amount of CPU usage. As a result, different polling periods are usually used to monitor each operating parameter.

Data source polling device 220 connects to controller 210 and agent polling device 230. Data source polling device 220 can be implemented in the processing unit of the data processing system, similar to processing unit 106 of FIG. 1. Data source polling device 220 is a device which gives or presents information regarding at least one operating parameter. Depending on the operating parameter, data source polling device 220 can be any type of device, including but not limited to a thermometer, an accelerometer, a digital readout device, an analog circuit, or any similar type of device used to read an operating parameter. In the illustrative embodiment, data source polling device 220 is a digital readout device monitoring the amount of CPU usage.

In the illustrative embodiment, data source polling device 220 provides updated information regarding the operating parameter for the data processing system at periodic intervals, otherwise referred to as a polling period. A polling period can be any frequency or amount of elapsed time ranging from a few seconds to several hours. Each time a polling period arises, data source polling device 220 provides updated information to agent polling device 230.

Agent polling device 230 can also be implemented in the processing unit of the data processing system, similar to processing unit 106 of FIG. 1. Agent polling device 230 is the application monitoring the overall operating parameters for a data processing system. Agent polling device 230 is a set of instructions that can be executed in the processing unit of the data processing system. Agent polling device 230 gathers the operating parameters and summarizes the information for a user of the data processing system. Agent polling device 230 requests the updated information from data source polling device 220 at a certain polling interval. Typically, agent polling device 230 requests updates at a different rate then data source polling device 220 is able to provide updated information. As a result, agent polling device 230 may request information at a faster rate than updated information is made available. Consequently, in many circumstances, the resulting information provided by data source polling device 220 sometimes results in redundant information being provided. As a result, unnecessary resources are expended in obtaining the most updated information, because the information is the same as the previous poll.

Memory 240 is a memory element that can be implemented in the main memory or hard disk drive of a data processing system, similar to main memory 108 and hard disk drive 126 of FIG. 1. Memory 240 can store data in any format, including but not limited to a table, a flat file, an extensible Markup Language (XML) file, a relational database management system, or any combination thereof. In the illustrative embodiment, memory 240 stores the algorithm for reducing overpolled data used by controller 210 in a flat file in the hard disk drive of the data processing system.

In use, the algorithm for reducing overpolled data identifies the most efficient polling period for agent polling device 230. To identify the most efficient polling period, the algorithm first identifies the number of redundant measurements during a single cycle. A cycle is a repetition of operating parameters and events that can include two or more polling periods. In the illustrative embodiment, one cycle includes all the same operating parameters and events in the same order as every other cycle.

A redundant measurement is a measurement that has not changed since the last polling period. A redundant measurement includes the same information as a previous measurement. All consecutive measurements that are identical form a set of redundant measurements. The set of redundant measurement includes the first measurement and any number of additional measurements that includes the same information as the first measurement.

After the set of redundant measurements are identified, controller 210 uses the number of consecutive redundant measurements to calculate the percentage of redundant polls. The percentage of redundant polls, "c", is reflected in the following formula:

$$c=i/(i-m).$$

where i is the number of polls taken in a single cycle and m is the number of redundant measurements in the single cycle. The current polling period is then multiplied by the percentage of redundant polls to form a new polling interval.

The illustrative embodiments are not limited to the illustrated example. For example, polling frequency system 200 can include more or fewer components. Additionally, data source polling device 220 and agent polling device 230 can be any other types of polling device.

Figure 3:
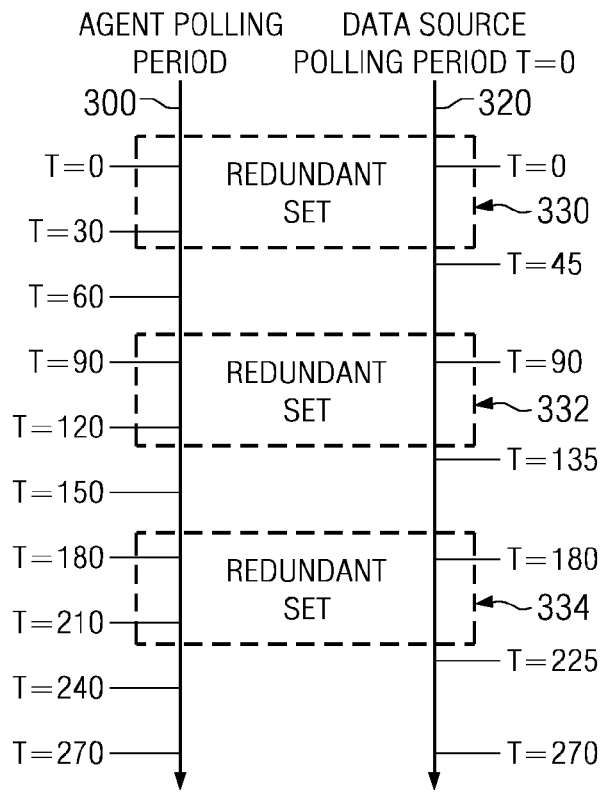
FIG. 3 illustrates an example set of redundant polling measurements, in accordance with an illustrative embodiment.

FIG. 3 illustrates an example set of redundant polling measurements, in accordance with an illustrative embodiment. FIG. 3 includes agent polling period 300 and data source polling period 320. Agent polling period 300 and data source polling period 320 can be implemented in an agent polling device and data source polling device similar to agent polling device 230 and data source polling device 220 of FIG. 2, respectively.

Agent polling period 300 identifies the frequency with which the agent polling device requests information from a data source. Data source polling period 320 indicates the frequency when new information from the data source is available. In the illustrative embodiment, agent polling period 300 requests information from the data source every 30 seconds. On the other hand, data source polling period 320 receives new information from the data source every 45 seconds. Since the frequency with which the data source device receives new information is less than the frequency with which the agent polls information from the data source device, several sets of redundant measurements result from the execution of the polling process. Specifically, in the illustrative embodiment, redundant sets 330, 332, and 334 result from the different polling periods. In the illustrative embodiment, redundant set 330 indicates that the measurement polled by the agent at T=0 seconds and T=30 seconds are the same. Likewise, redundant set 332 indicates that the measurement polled by the agent at T=90 seconds and T=120 seconds are the same. Furthermore, redundant set 334 identifies that the same measurements are polled by the agent at T=180 seconds and T=210 seconds.

Thus, in use, in the illustrative embodiments, a controller first identifies the sets of redundant measurements, similar to redundant sets 330, 332, and 334. The controller then identifies the number of measurements that are identical in a single set of redundant measurements. In the illustrative embodiment, agent polling period 300 has one measurement that identical to the first measurement for each redundant set 330, 332, and 334.

After identifying the number of redundant measurements, the controller then establishes the frequency with which the measurements are redundant. In the illustrative embodiment, every third measurement is redundant with the second measurement. Therefore, in the illustrative embodiment, a single cycle for agent polling period 300 includes three polling periods, with one measurement being repeated within each cycle.

After identifying the number of polling periods in a cycle and the number of measurements repeated per cycle, the controller then calculates the percentage of redundant polls using the formula:

$$c=i/(i-m).$$

In the illustrative embodiment, the percentage of redundant polls "c" is 3/2 derived as follows:

$$c=3/(3-1)=3/2.$$

After deriving "c", the controller then calculates the new polling period by multiplying "c" with the current polling period for agent polling period 300. Thus, in the illustrative embodiment, the current polling period for agent polling period 300 is 30 seconds. Therefore, the new polling period is 30 seconds*3/2=45 seconds. The controller then automatically converts the current polling period to the new polling period. In an alternative embodiment, instead of automatically implementing the new polling period, the controller can request a system administrator to approve the new polling period prior to converting the data processing system to the new polling period.

The illustrative embodiments are not limited to the illustrated example. For example, agent polling period 300 and data source polling period 320 can include more or fewer polling periods. Additionally, agent polling period 300 and data source polling period 320 can poll at a different frequency than the frequency shown. Furthermore, agent polling period 300 and data source polling period 320 can include a variety of different sets of redundant measurements, with agent polling period 300 including more than one redundant measurement in a single set of redundant measurements.

Figure 4:
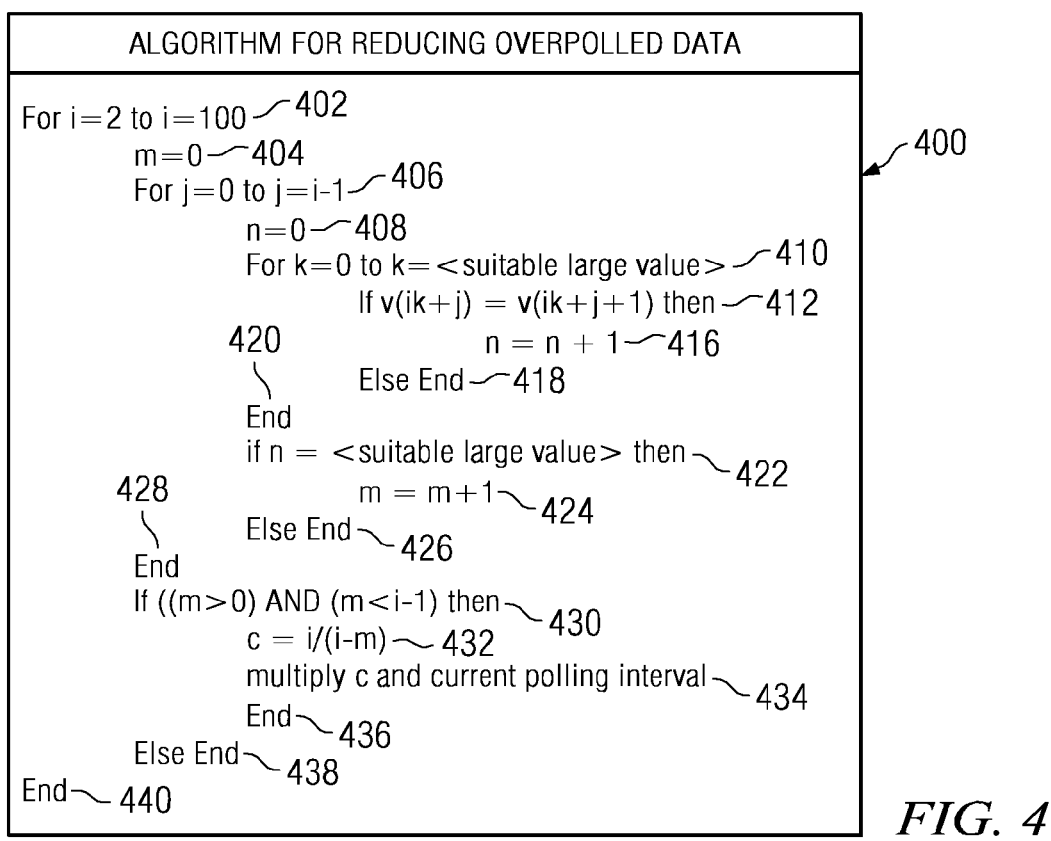
FIG. 4 is an algorithm for reducing overpolled data, in accordance with an illustrative embodiment.

FIG. 4 is an algorithm for reducing overpolled data, in accordance with an illustrative embodiment. Algorithm 400 can be implemented in a controller for a polling frequency system, similar to controller 210 of FIG. 2 and stored in a memory, similar to memory 240 of FIG. 2.

Algorithm 400 comprises three loops: "i", "j", and "k". Loop "i" is the outer most loop and begins on line 402 and ends with line 440. Loop "i" represents the size of the cycle that may include redundant measurements at specific points in the cycle. Each value in loop "i" represents the polling frequency that is currently being checked. Loop "j" identifies the location where a particular measurement repeats in loop "i". Loop "j" also identifies the set of redundant measurements. For example, loop "j" determines whether the measurement repeats every third polling period, at the second and sixth polls in a seven polling period cycle, or other polling frequency. Loop "j" begins with line 406 and ends with line 428. Loop "k" checks that the measurements are indeed redundant across a large number of cycles of the same size. Loop "k" begins with line 410 and ends with line 420. The three loops, "i", "j", and "k", result in the identification of the most efficient polling interval.

For each value of "i", the value of "m" is initially set to "0" (line 404). "m" is the number of times a measurement repeats in a set of redundant measurements. For example, referring back to FIG. 3, redundant set 330 includes two identical measurements at T=0 and T=30 for agent polling period 300. Therefore, the measurement at T=30 is repeated one additional time after the first measurement at T=0. Thus, applying redundant set 330 to algorithm 400, "m" would have a resulting value of "1" after algorithm 400 is executed.

For each value of "j", the value of "n" is initially set to "0" (line 408). "n" is the number of times that a measurement actually repeats within a cycle. If the value of "n" is equivalent to all the values in "k" or, in other words, all the values in "k" are the same, the measurements in the cycle are confirmed to be redundant (lines 410 through 420). The value of "m" then increases by one (lines 424).

If the value of "m" is greater than zero and less than "i−1", then a new polling interval is calculated. The controller first calculates the percentage of redundant polls "c" (line 432). The controller then multiplies the value of "c" by the current polling interval (line 434), thereby resulting in the calculation of a new polling interval.

The illustrative embodiments are not limited to the illustrative example. For example, algorithm 400 may include additional instructions outside of the instructions presented in lines 402 through 440. Additionally, other variables may be used to represent the calculations and instructions without deviating from the scope of the illustrative embodiments.

The illustrative embodiments provide a computer implemented method, an apparatus, and computer usable program code for reducing overpolled data in a data processing system. A controller identifies a set of redundant measurements in a cycle. The controller then identifies a number of measurements repeated in the set of redundant measurements. The controller then computes a percentage of redundant polls based on the number of measurements repeated in the set of redundant measurements. The percentage of redundant polls is calculated by dividing the cycle by the difference in the cycle and the number of measurements repeated. The controller then computes a new polling period by increasing an original polling period by the percentage of redundant polls.

Therefore, the illustrative embodiments optimize the polling periods of a data processing system. As a result, the illustrative embodiments reduce the number of unnecessary polls requested by the data processing system. Additionally, the illustrative embodiments free up resources to be used for other activities.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reducing overpolled data in a data processing system, the computer implemented method comprising:
   identifying, by a controller, a set of redundant measurements in a cycle;
   identifying a number of measurements repeated in the set of redundant measurements;
   computing a percentage of redundant polls based on the number of measurements repeated in the set of redundant measurements; and
   computing a new polling period by increasing an original polling period by the percentage of redundant polls.

2. The computer implemented method of claim 1, wherein the percentage of redundant polls is calculated by dividing the cycle by the difference in the cycle and the number of measurements repeated.

3. The computer implemented method of claim 1 further comprising:
   responsive to identifying the number of measurements repeated in the set of redundant measurements, verifying that the number of measurements repeated are actually repeated in the cycle.

4. A data processing system comprising:
   one or more processors;
   a controller;

an agent polling device connected to the controller, wherein the agent polling device requests, by the one or more processors, measurements from a data source polling device at a first polling period, wherein the first polling period comprises a frequency with which the agent polling device requests data from the data source polling device; and the data source polling device that requests updated measurements at a second polling period, wherein the second polling period comprises a frequency slower than the first polling period, and wherein the controller identifies a set of redundant measurements in a cycle resulting from the second polling period being slower than the first polling period, and wherein the controller identifies a number of measurements repeated in the set of redundant measurements, and wherein the controller computes a percentage of redundant polls based on the number of measurements repeated in the set of redundant measurements, and wherein the controller computes a new polling period by reducing an original polling period by the percentage of redundant polls.

5. The data processing system of claim 4, wherein the percentage of redundant polls is calculated by dividing the cycle by the difference in the cycle and the number of measurements repeated.

6. The data processing system of claim 4, wherein the controller verifies that the number of measurements repeated are actually repeated in the cycle in response to identifying the number of measurements repeated in the set of redundant measurements.

7. A computer program product for reducing overpolled data in a data processing system, the computer program product comprising a computer-readable, non-transitory storage device, tangibly embodying computer usable instructions thereon, the computer usable instructions including:

computer usable program code for identifying, by a controller, a set of redundant measurements in a cycle;

computer usable program code for identifying a number of measurements repeated in the set of redundant measurements;

computer usable program code for computing a percentage of redundant polls based on the number of measurements repeated in the set of redundant measurements; and computer usable program code for computing a new polling period by reducing an original polling period by the percentage of redundant polls.

8. The computer program product of claim 7, wherein the percentage of redundant polls is calculated by dividing the cycle by the difference in the cycle and the number of measurements repeated.

9. The computer program product of claim 7 further comprising:

computer usable program code responsive to identifying the number of measurements repeated in the set of redundant measurements for verifying that the number of measurements repeated are actually repeated in the cycle.

* * * * *